Nov. 21, 1939. O. K. BUTZBACH 2,180,579
GEAR SHIFTING MECHANISM
Filed Aug. 15, 1938
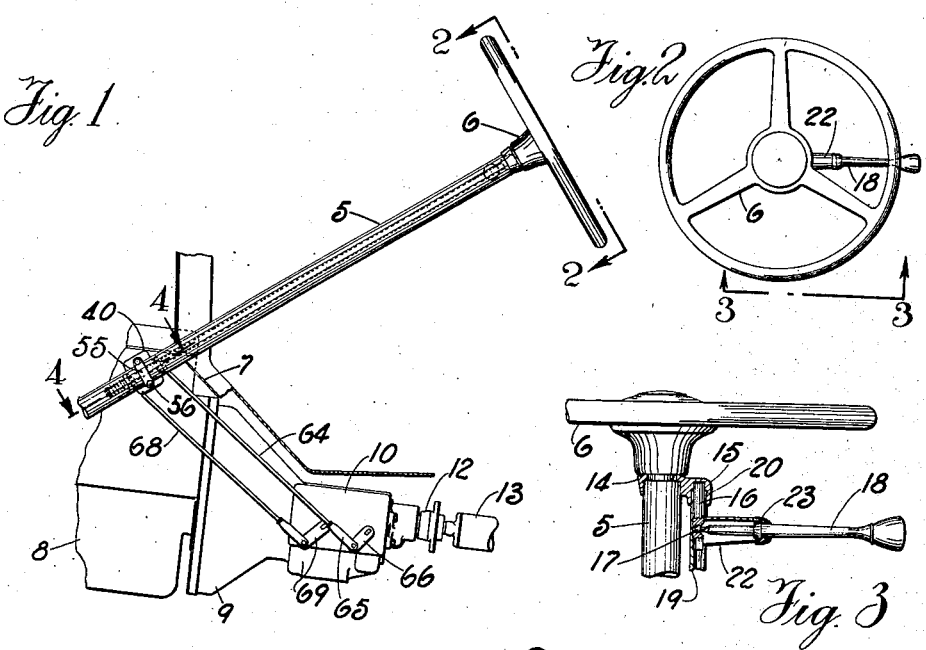
INVENTOR.
Orville K. Butzbach
BY Walter E. Schirmer
ATTORNEY.

Patented Nov. 21, 1939

2,180,579

UNITED STATES PATENT OFFICE 2,180,579

GEAR SHIFTING MECHANISM

Orville K. Butzbach, South Bend, Ind., assignor to The Studebaker Corporation, South Bend, Ind., a corporation of Delaware Application August 15, 1938, Serial No. 224,879

8 Claims. (Cl. 74—473)

This invention relates to gear shifting mechanism and more particularly is directed to a remote control gear shifting mechanism for the transmissions of automobiles and similar vehicles.

A number of types of mechanisms have been developed in the last few years for shifting the gears of transmissions without the use of the conventional pedal-mounted gear shift lever extending through the floor board of the vehicle. Such mechanisms have in general been rather costly and complicated in design and have not proved entirely satisfactory.

The present invention contemplates a mechanism supported beneath the steering wheel on the steering post whereby gear shifting movement is transmitted to a selecting and actuating mechanism mounted beneath the floor board on the steering post and from which the desired shifting movement is transmitted to the gear box.

Considering the invention more in detail, one of the primary objects thereof is to provide a simplified remotely controlled gear shifting mechanism including an arm mounted for both rotative and axial shifting movement and which may be controlled from adjacent the steering wheel to move in an axial direction for selecting the desired gear shifting fork and is then rotated in engagement with such fork to produce the desired shifting movement of the fork.

Another object of the present invention is to provide means for preventing rotation of the actuating arm except when it is in a position engaging only one of the shifting forks.

Still another feature of the present invention is the provision of means for normally maintaining the arm in engagement with the fork controlling second and third speeds in the transmission whereby a conscious effort is required on the part of the operator to shift the transmission either into first or reverse speeds.

Still another advantage obtained by the present invention is the simplicity of construction as compared with those with which I am familiar as well as the ease of assembly and positive operation obtained with the present construction.

Other objects and advantages will be more apparent from the detailed description which taken in conjunction with the accompanying drawing will disclose to those skilled in the art the particular construction and operation of the preferred form of the present invention.

In the drawing:

Figure 1 is a side elevational view of the steering post and transmission mechanism of a conventional automobile equipped with my novel gear shifting mechanism;

Figure 2 is a generally top plan view taken substantially on line 2—2 of Figure 1;

Figure 3 is a side elevational view, partly in section, of the spring and automatic gear shifting mechanism taken substantially on the line 3—3 of Figure 2;

Figure 4 is a sectional view through the lower end of the gear shifting mechanism taken substantially on the line 4—4 of Figure 1; and Figure 5 is an exploded perspective view of the parts and their relationship which comprise the selecting and actuating portions of the mechanism.

Considering now in detail the embodiment of the invention which has been illustrated herein, the standard steering post is indicated at 5 and at its upper end has rotatably mounted thereon the steering wheel 6. The post 5 is adapted to extend through the inclined toe board 7 and at its lower end terminates in the usual steering arm actuated by the wheel 6.

Supported below the toe board 7 is the power plant 8 of the vehicle together with the clutch housing 9 to which is secured the transmission case 10. The output shaft of the transmission case is connected through the flexible shaft 12 through a torque tube or similar propeller means 13 leading to the rear axle of the vehicle.

As shown clearly in Figures 2 and 3, mounted immediately beneath the hub of the steering wheel 6 and above the post 5 is a bracket 14 having a laterally extending portion 15 adapted to carry a depending guide pin 16 fixed in position within the bracket portion 15 and provided intermediate its ends with a recess forming a fulcrum bearing point for the end 17 of the gear shift actuating lever 18. Surrounding the member 16 is a hollow tube 19 which is guided upon the member 16 for relative axial movement with respect thereto into and out of the counterbored recess 20 formed in the extension 15 of the bracket 14 about the member 16. The tube 19 is provided with an offset extension or housing 22 which is suitably formed at its ends to provide a substantially universal support as indicated at 23 for the intermediate portion of the actuating lever 18. It will be apparent that when the lever 18 is rocked upwardly with respect to the pivot point 17 it will tend to move the tube 19 upwardly about the member 16 and thus shift it axially with respect to the steering post 5. A similar downward movement of the tube 19 will, through the seat 23, cause the lever 18 to move downwardly pivoting about the fulcrum 17.

The lower end of the lever 19 is adapted to extend through a pair of axially spaced sleeve members 30 and 32 which in turn have secured thereto radially extending arms 33 and 34, respectively, and also axially spaced thereon the radially extending forks 35 and 36. Beneath the arms 33 and 34 the forks 35 and 36 are welded or otherwise rigidly secured to the sleeves 30 and 32 so that the arm 33 and the fork 35 are conjointly rotated with the sleeve 30. Similarly, the arm 32 and the fork 36 are conjointly rotated with the sleeve 32. Thus the sleeves 30 and 32 are supported for rotation in the journal portions 37 and 38 of a two piece housing comprising the cap portion 39 and the supporting portion 40 which are bolted together about their flanged faces 42 to provide the complete assembly shown in Figure 4. Preferably the journal portions 37 and 38 of the housing member 39—40 are recessed to provide for reception of suitable lubricant oiling means and the cap member 39 of the housing 39—40 is provided with a suitably tapped portion 43 adapted to receive a lubricant fitting for permitting the filling of the housing within the journal portions 37 and 38 with suitable lubricant.

Mounted on the rod or tube 19 intermediate the sleeves 30 and 32 is a selector arm 46 which is welded or otherwise rigidly secured for rotative movement with the tube and which has an extending portion adapted for selective engagement upon axial shifting movement of the tube 19 with the fork portions 47 and 48, respectively, of the forks 35 and 36. The forked portions 47 and 48 will bend normally with the radial extension of the forks 35 and 36 and extend toward each other, there being a clearance therebetween less than the arm 46 thereby eliminating any possibility of the arm 46 coming out of engagement with either one or other of the forks. The end of the tube 19 is provided with a suitably retained washer or seat member 49 which forms a seat for one end of the coil spring 50 which is abutted at its opposite ends against the sleeve 32. This spring member 50 normally urges the tube 19 downwardly to engage with the arm 46 within the forked portion 38 of the fork 36 as shown clearly in Figures 4 and 5. In this position the shift lever 18 is in the position shown in Figure 3 and upward movement on the outer end of the shift lever 18 results in moving the tube 19 upwardly against the pressure of the spring 50 and results in operating the arm 46 out of engagement with the fork 36 and into engagement with the fork 35.

Preferably the supporting portion 40 of the housing is provided with a transverse web 52 which is positioned as clearly indicated in Figure 4 in such manner that the arm 46 engages therewith when the arm is moved to a position such that it is intermediate the ends of the forks 35 and 36. As will be noted in Figure 5, the arm 46 is provided with a flatted end 53 thereby maintaining the arm 46 against rotation when it is moving in an axial direction across the space between the forks 35 and 36, the flatted portion 53 of the arm sliding over the flatted portion 32 of the web. This eliminates any possibility of the shift lever 18 being actuated in a horizontal direction to rotate the arm 46 when the arm is in a position such that it could engage both forks. Also, this insures that the forks 35 and 36 will always be returned to neutral position before the tube 19 can be shifted axially, thus insuring proper alinement between the arm 46 and the forks, and preventing possible rotation of the arm 46 when in a position intermediate either fork engaging position. In other words, the web 52 and the flatted portion 53 of the arm interlock the arm against rotation, directing the axial shifting movement from the fork 36 to the fork 35 and vice versa. The housing which encloses the forks and selector arm 46 is supported on the steering post 5 by means of a clamp member 55 which extends about the far side of the post and is bolted or otherwise suitably secured to the member 40 by means of the bolts indicated at 56 in Figure 4. Preferably a suitable lock 57 is interposed between the members 40 and 55 and engages a suitably flatted portion on the portion 55 to its flatted surface 58 to key the housing assembly 39—40 against possible rotation relative to the steering post thereby maintaining the housing in alinement with the bracket 14 at the upper end of the post to prevent any possible twist being imparted to the tube 19.

As will be noted clearly in Figures 4 and 5, the ends of the arms 33 and 34 are each provided with apertures 60 and 62, respectively, the aperture 60 being adapted to receive the manually turned end 63 of a motion transmitting rod 64 connected through the coupling clevis 65 to an arm 66 carried by the transmission case 10. The arm 66 is mounted at its opposite end on a suitable shaft projecting through the transmission case and carries a shifter fork adapted, upon rotation of the arm in opposite directions, to selectively shift the transmission into second or third speeds.

Similarly the arm 34 is adapted to receive in the aperture 62 the end 67 of a motion transmitting rod 68 which is connected at its opposite end to a second rocking arm 69 carried by the transmission case and which is selectively rotatable to shift the transmission into low or reverse speed. The transmission and the connection of the arms 66 and 69 thereto is more clearly disclosed in the copending application of Leo O. Burt, Serial No. 199,559, filed April 2, 1938, and reference should be made to such application for the details of this construction.

In the operation of the gear shift mechanism as disclosed in the instant application it will be noted that the spring 50 in the lower end of the rod 19 maintains the actuating lever 18 in the position shown in Figure 3. In this position the arm 46 is engaged with the fork 36 and consequently rotation of the lever 18 and corresponding rotation of the tube 19 will result in a rocking movement of the arm 34 which in turn will actuate the second and high speed shift forks in the transmission case. However, if the lever 18 is raised about the fulcrum 17 the spring 50 is compressed and the rod 19 moves upwardly thereby moving the arm 46 out of engagement with the fork 36 and into engagement with the fork 35. The arm during this movement is maintained against rotation by the abutment of the flatted end 53 thereof with the web 52.

With the arm in this raised position, rotation of the lever 18 will rock the arm 33 and will thus control the shifting movement imparted to the transmission and effect a low or reverse shifting. It is therefore believed apparent that the operator must by a conscious effort move the lever 18 upwardly against the pressure of the spring 50 to effect a shifting into either low or reverse speeds. Consequently in attempting to shift from low to second speeds the spring pressure will be effective to drop the lever 18 downwardly into the position shown in Figure 3 so that the arm 46 will drop into the fork 36 and thus allow shifting into second and high speeds.

It is believed readily apparent that the mechanism as thus shown is simple in construction and assembly, may be made from relatively few parts which are economical to manufacture, and is positive in operation. Furthermore, by the interlocking arrangement as described it is impossible to produce a clashing of gears and the normal sequence of the shifting movement is more or less assured.

I am aware that a number of minor changes may be made in certain details of construction and design of the present invention and I therefore do not intend to be limited except as defined by the scope and spirit of the appended claims.

I claim:

1. Remotely controlled shift means comprising a rod mounted for axial and rotative movement, an arm carried by said rod adjacent one end thereof, a pair of sleeves about said rod on opposite sides of said arm, a housing providing a journal for said sleeves and enclosing said arm, a fork on each sleeve having end portions turned toward each other within said housing and adapted to receive the end of said arm, and means between said arm and housing preventing rotation of said arm except in limiting axially shifted positions of said rod and preventing axial shifting of the rod except in alined position of said forks.

2. Remotely controlled shift means comprising a rod, a housing through which one end of said rod extends, spaced sleeves on said rod journalled in said housing, each sleeve having a fork extending radially therefrom and then turned normally toward each other to form alined facing recesses, said forks being intermediate said housing journals, an arm secured to said rod intermediate said sleeves and engageable with said forks, means for axially shifting the rod to move said arm selectively into engagement with one or the other of said forks, and means for rotating said rod to effect corresponding rotation of the selected fork.

3. The combination, in a vehicle having a steering post and a transmission, of a rod journalled at one end thereof adjacent the top of the post, means associated with said journal for shifting said rod axially and selectively rotating the same in axially shifted position, means forming a journal support for the lower end of the rod including axially spaced sleeves, an arm secured to said rod intermediate said sleeves, motion transmitting means between each of said sleeves and shift means in said transmission, and forks on said sleeves directed axially toward each other and selectively engaged by said arm upon alternate axial shifting of said rod, and rotated upon rotation of said rod for actuating the corresponding motion transmitting means.

4. The combination of claim 3 including means in said journal support engaging said arm for preventing axial shifting of said rod except when said arm is in a predetermined position therein.

5. In a selective motion transmitting mechanism, a two piece housing having journal supports for a pair of axially spaced sleeves, said sleeves having radially projecting arms externally of the housing, and radially projecting axially directed forks within the housing, a rod extending through said sleeves and carrying an actuating arm located between said sleeves, said arm being selectively engageable with said forks upon axial shifting of said rod, and means in said housing engaging said arm for preventing axial shifting of said arm from one fork to the other until said arm has been rotated into a predetermined position alining said forks.

6. In combination, a housing having spaced journals therein, sleeves rotatably mounted in said journals, a rod extending through said sleeves and having a radially extending arm secured thereon intermediate the sleeves, a web in said housing, a flatted surface on said arm, means remote from said housing for shifting said rod axially only when said flatted surface is in predetermined relation to said web, means on said sleeves within the housing each having fork portions directed toward each other, said rod arm extending into said forked portions for selectively engaging either of said sleeves for rotation upon axial shifting of said rod, and means normally biasing said rod and arm into engagement with one of said fork portions.

7. In combination, a housing, a rod extending through the housing and axially shiftable with respect thereto, sleeves journalled in the housing and forming guides for reciprocating movement of the rod, a radially extending arm on the rod intermediate said sleeves, motion transmitting levers secured to each sleeve exteriorly of the ends of said housing, radially extending arms on said sleeves within said housing and disposed on opposite sides of said rod arm, fork means carried by each of said sleeve arms at a point spaced radially from said rod and selectively engageable by said rod arm for locking the rod arm and the selected sleeve arm together for conjoint rotation, and means engaging said rod at a point remote from said housing for imparted selected axial and rotative movement thereto.

8. The combination of claim 7 further characterized by web means in said housing cooperating with said arm for preventing rotation of said rod arm when in a position intermediate engaged position with either of said sleeve arms, and also preventing said rod from being shifted axially except when said rod arm is in a predetermined angular position in said housing.

ORVILLE K. BUTZBACH.